(12) United States Patent
Thubert et al.

(10) Patent No.: US 10,887,224 B2
(45) Date of Patent: Jan. 5, 2021

(54) ELIMINATING SATURATION ENCOUNTERED BY RPL STORING MODE PARENT NETWORK DEVICE

(71) Applicant: Cisco Technology, Inc., San Jose, CA (US)

(72) Inventors: Pascal Thubert, Roquefort les Pins (FR); Huimin She, Shanghai (CN); Patrick Wetterwald, Mouans Sartoux (FR); Li Zhao, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 37 days.

(21) Appl. No.: 16/397,124

(22) Filed: Apr. 29, 2019

(65) Prior Publication Data

US 2020/0344159 A1    Oct. 29, 2020

(51) Int. Cl.
*H04L 12/46* (2006.01)
*H04L 12/751* (2013.01)
*H04L 12/753* (2013.01)
*H04L 29/08* (2006.01)

(52) U.S. Cl.
CPC .......... *H04L 45/48* (2013.01); *H04L 67/1097* (2013.01)

(58) Field of Classification Search
CPC ......... H04L 45/02; H04L 45/28; H04L 41/12; H04L 45/22; H04L 12/4633; H04L 12/4641; H04L 47/125; H04L 45/125; H04L 47/32; H04L 41/14; H04L 43/04; H04L 43/062; H04L 43/0864; H04L 43/0876

See application file for complete search history.

(56) References Cited

U.S. PATENT DOCUMENTS

| 7,428,221 B2 | 9/2008 | Thubert et al. |
| 7,924,722 B2 | 4/2011 | Thubert et al. |
| 8,718,055 B2 | 5/2014 | Vasseur et al. |

(Continued)

OTHER PUBLICATIONS

Minter, Ed., et al., "RPL: IPv6 Routing Protocol for Low-Power and Lossy Networks", Internet Engineering Task Force (IETF), Request for Comments: 6550, Mar. 2012, pp. 1-157.

(Continued)

*Primary Examiner* — Sai Aung
(74) *Attorney, Agent, or Firm* — Leon R. Turkevich

(57) ABSTRACT

In one embodiment, a method comprises attaching, by a constrained network device in a data network, to a first parent network device in a tree-based storing mode topology in response to receiving a first advertisement message generated by the first parent network device; outputting to the first parent network device a plurality of routes stored in the constrained network device, the routes identifying destinations reachable via the constrained network device; determining, by the constrained network device, that the first parent network device is encountering saturation of stored routes based on the constrained network device receiving a second advertisement message from the first parent network device; and eliminating, by the constrained network device, the saturation encountered by the first parent network device based on moving at least a portion of the routes from the first parent network device to a second parent network device in the tree-based storing mode topology.

20 Claims, 9 Drawing Sheets

(56) References Cited

U.S. PATENT DOCUMENTS

| | | | |
|---|---|---|---|
| 2014/0269691 A1* | 9/2014 | Xue | H04L 45/125 370/389 |
| 2016/0254991 A1* | 9/2016 | Eckert | H04L 45/28 370/225 |
| 2017/0063685 A1 | 3/2017 | Vedantham et al. | |
| 2017/0273002 A1 | 9/2017 | Chen et al. | |
| 2019/0190588 A1* | 6/2019 | Higgins | H04W 48/16 |
| 2019/0363978 A1* | 11/2019 | Singh | H04L 49/102 |
| 2020/0036632 A1* | 1/2020 | Kommula | G06F 9/45558 |
| 2020/0044957 A1* | 2/2020 | Allan | H04L 41/0816 |

OTHER PUBLICATIONS

Researchgate, "What is the beauty of RPL Protocol in Internet of Things?", [inline], Mar. 3, 2017, [retrieved on Apr. 10, 2019]. Retrieved from the Internet: URL: <https://www.researchgate.net/post/what_is_the_beauty_of_RPL_routing_protocol_in_Internet_of_Things>, pp. 1-3.

Sharma et al., "A Detailed Classification of Routing Attacks against RPL in Internet of Things", [online], International Journal of Advance Research, Ideas and Innovations in Technology, 2017 vol. 3, Issue 1, [retrieved on Jan. 21, 2019]. Retrieved from the Internet: URL: <https://www.ijariit.com/manuscripts/v3i1/V3I1-1257.pdf>, pp. 692-703.

Thubert et al., U.S. Appl. No. 16/214,318, filed Dec. 10, 2018.

\* cited by examiner

ELIMINATING SATURATION ENCOUNTERED BY RPL STORING MODE PARENT NETWORK DEVICE

TECHNICAL FIELD

The present disclosure generally relates to eliminating saturation encountered by a RPL storing mode parent network device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes" or "RPL network devices". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other RPL network devices to discover the DODAG, learn the updated network topology metrics, and select a DODAG parent.

Downward routes (i.e., away from the DAG root) can be created based on Destination Advertisement Object (DAO) messages that are created by a RPL node and propagated toward the DAG root. The RPL instance can implement downward routes in the DAG of the LLN in either a storing mode only (fully stateful), or a non-storing mode only (fully source routed by the DAG root). In storing mode, a RPL node unicasts its DAO message to its parent node, such that RPL nodes store downward routing table entries for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

A problem in implementing storing mode in a RPL instance is that a storing-mode parent network device can become saturated if its constrained memory runs out of free memory space for storage of any more routes of child network devices attached to the storing-mode parent network device; the problem is magnified in a storing-mode "grandparent" device (i.e., parent of a parent network device) that also is required to store the routes of its children that act as storing-mode parent network devices. Hence, the problem of saturation in a storing-mode parent network device can limit the scalability of a RPL instance comprising constrained network devices having limited memory sizes.

BRIEF DESCRIPTION OF THE DRAWINGS

Reference is made to the attached drawings, wherein elements having the same reference character designations represent like elements throughout and wherein.

DESCRIPTION OF EXAMPLE EMBODIMENTS

Overview

Figure 1A:
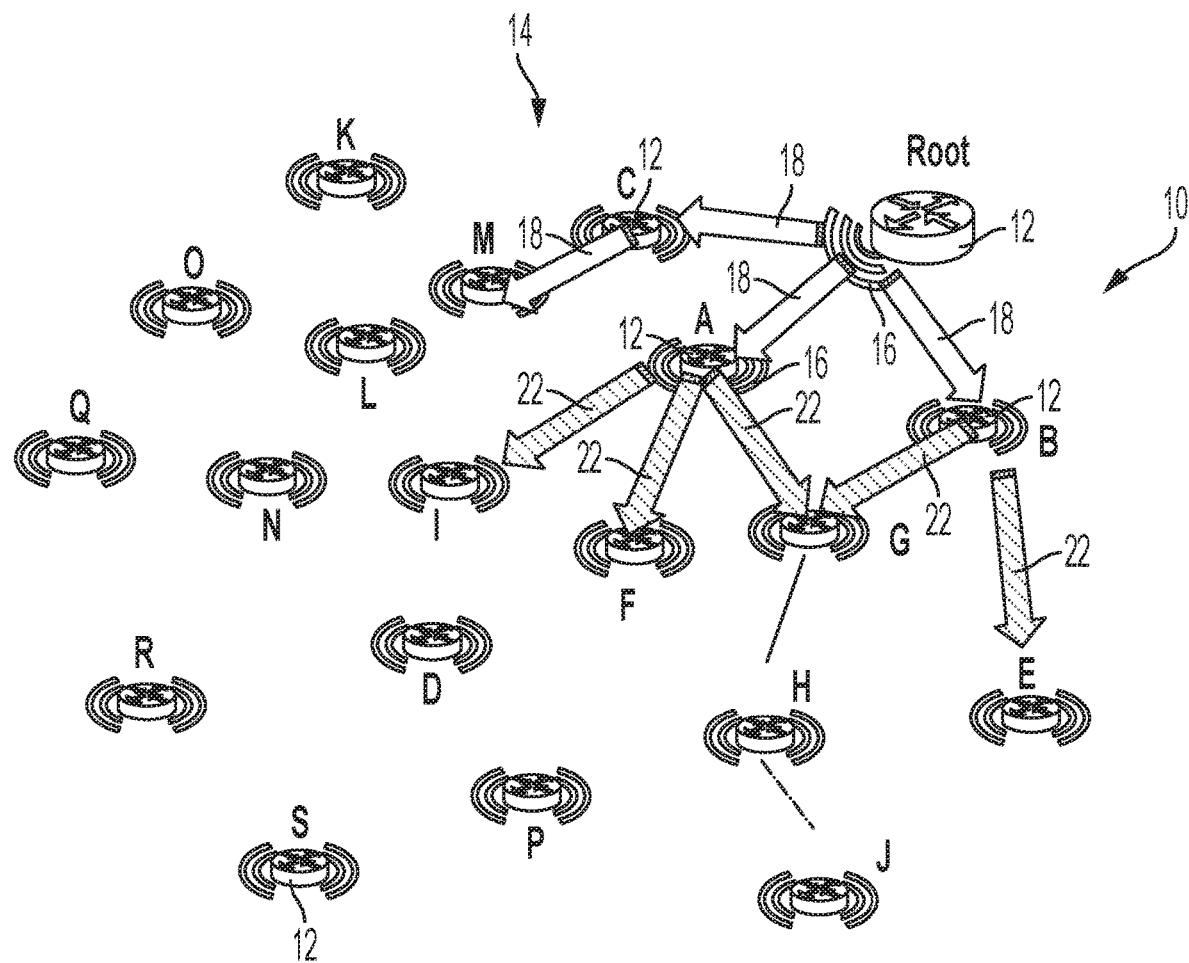
FIGS. 1A-1D illustrate an example data network having a tree-based RPL topology comprising one or more RPL child network devices configured for eliminating saturation encountered by a RPL storing mode parent network device, according to an example embodiment.

In one embodiment, a method comprises attaching, by a constrained network device in a data network, to a first parent network device in a tree-based storing mode topology in response to receiving a first advertisement message generated by the first parent network device; outputting to the first parent network device a plurality of routes stored in the constrained network device, the routes identifying destinations reachable via the constrained network device; determining, by the constrained network device, that the first parent network device is encountering saturation of stored routes based on the constrained network device receiving a second advertisement message from the first parent network device; and eliminating, by the constrained network device, the saturation encountered by the first parent network device based on moving at least a portion of the routes from the first parent network device to a second parent network device in the tree-based storing mode topology.

In another embodiment, an apparatus is implemented as a physical machine and comprises a device interface circuit, a memory circuit, and a processor circuit. The device interface circuit is configured for receiving, from a first parent network device in a tree-based storing mode topology of a data network, a first second advertisement message. The apparatus is implemented as a constrained network device. The memory circuit is configured for storing route entries specifying respective routes for reaching respective destinations in the storing mode topology via the constrained network device. The processor circuit is configured attaching to the first parent network device in response to receiving the first advertisement message, and outputting to the first parent network device, via the device interface circuit, the routes stored in memory circuit. The processor circuit further is configured for: determining that the first parent network device is encountering saturation of stored routes based on the device interface circuit receiving a second advertisement message from the first parent network device, and eliminating the saturation encountered by the first parent network device based on moving at least a portion of the routes from the first parent network device to a second parent network device in the tree-based storing mode topology.

In another embodiment, one or more non-transitory tangible media encoded with logic for execution by a machine and when executed by the machine operable for: attaching, by the machine implemented as a constrained network device in a data network, to a first parent network device in a tree-based storing mode topology in response to receiving a first advertisement message generated by the first parent network device; outputting to the first parent network device a plurality of routes stored in the constrained network device, the routes identifying destinations reachable via the constrained network device; determining, by the constrained network device, that the first parent network device is encountering saturation of stored routes based on the constrained network device receiving a second advertisement message from the first parent network device; and eliminating, by the constrained network device, the saturation encountered by the first parent network device based on moving at least a portion of the routes from the first parent network device to a second parent network device in the tree-based storing mode topology.

DETAILED DESCRIPTION

Particular embodiments enable the distributed rebalancing of stored routes in a tree-based storing mode topology in a data network (e.g., an Internet Protocol (IP) based data network), based on a child network device detecting a parent network device is encountering saturation of stored routes. The child network device can detect the parent network device is encountering saturation based on saturation information in a received topology advertisement message advertising topology parameters associated with generating the tree-based storing mode topology, for example a DIO advertisement message according to RPL: the child network device can respond to detecting the saturation by eliminating the saturation encountered by the parent network device. In one embodiment, a child network device can avoid attaching to an advertising RPL network device encountering saturation; in another embodiment, the child network device can eliminate the saturation encountered by the parent network device based on moving at least a portion of stored routes stored in the parent network device (previously sent by the child network device to the parent network device via one or more DAO messages) to a second (alternate) parent network device that is not encountering saturation.

Particular embodiments also enable a child network device, having attached to a parent network device, to generate and output an updated advertisement message that includes an updated saturation metric that can be based on not only on the number of local free route entries in the child network device, but also based on the free route entries available for storage in one or more of its parent network devices. In particular, storing-mode parent network devices in a storing mode RPL topology typically are required to store routes specified in DAO messages that are generated and propagated toward the root by child network devices attached to the storing-mode parent network devices; hence, a storing-mode parent network device typically is required to store all routes received from its attached child network devices, and output to its own parent network device (i.e., the "grandparent" of the attached child network devices) all of its stored routes to ensure the grandparent network device maintains reachability to all child network devices in its sub-DAG.

Hence, a RPL child network device can generate and output an updated DIO advertisement message that includes an updated saturation metric identifying a number of free route entries that are available for storage "via" the RPL child network device: the RPL child network device can determine the number of free route entries that are available for storage "via" the RPL child network device based on determining a relative minimum availability between the free route entries available for storage in one or more of its parent network devices as well as its own number of local free route entries. The availability of multiple parent network devices by a RPL child network device also can increase a probability that at least some of the multiple parent network devices can share a common grandparent network device (resulting in duplication of route entries in the common grandparent network device via the respective parent network devices); hence, the RPL child network device also can apply a "parent normalization factor" to account for the possibility of the common grandparent network device required to store multiple route entries for the same destination (e.g., the child network device or another sub-child attaching to the child network device) via respective attached network devices.

Hence, the example embodiments enable proactive management in a distributed manner of stored route entries within network devices in a data network comprising a tree-based storing mode RPL topology, where potential child network devices can avoid attaching to parent network devices encountering saturation (either locally or via a saturated grandparent), and existing child network devices can eliminate saturation based on moving at least a portion of the stored routes from the first saturated parent to a second unsaturated parent. The example embodiments also can optimize storage between parent network devices based on dynamically adjusting storage of routes in a first parent network device based determining a determined saturation transition level for the parent network device, and returning previously-removed routes for storage back into the first parent network device until converging on the determined saturation transition level.

FIGS. 1A-1D illustrate an example data network 10 (e.g., an IP-based data network) comprising network devices 12 configured for establishing a tree-based network topology 14, for example a Directed Acyclic Graph (DAG) or a Destination Ordered DAG (DODAG), according to an example embodiment. Each of the network devices (e.g., "Root", "A" through "S") 12 can be configured for forming a DAG network topology 14 via wired or wireless data links 16, for example according to RPL as specified in the Internet Engineering Task Force (IETF) Request for Comments (RFC) 6550. Each network device 12 also can be implemented as a constrained RPL device, described previously as constrained by processing power, memory, energy (e.g., battery power), and/or constrained data links 16 (e.g., high loss rates, low data rates, low packet delivery rates, etc.).

Each of the network devices (e.g., "A" through "S") 12 can be attached to at least one of another network device 12 or a root network device "ROOT" 12 via wireless data links 16 that form a link layer mesh topology. Although only the network devices "ROOT", "A", "B", "C", and "S" are labeled with the reference numeral "12" in the Figures to avoid cluttering in the Figures, it should be apparent that all the network devices "A" through "S" are allocated the reference numeral "12" for purposes of the description herein. Further, it should be apparent that all the network devices "A" through "S" 12 can be configured for establishing wireless data links 16 (illustrated as curved lines radiating from each device 12) that establish the link layer mesh topology, even though only the wireless data links for the network device "A" 12 and the root network device "ROOT" 12 are labeled with the reference numeral "16" to avoid cluttering in the Figures.

Although not shown in the Figures, any one of the network devices 12 also can be attached to one or more root network devices, for example where a plurality of root network devices can be connected via a wired data link to form a "backbone" network comprising one or more backbone routers for the data network 10.

As described previously, the DAG topology 14 can be established by the network devices 12 overlying a link layer mesh based on the network devices 12 exchanges routing protocol messages according to a prescribed routing protocol, for example RFC 6550, entitled "RPL: IPv6 Routing Protocol for Low-Power and Lossy Networks". The root network device "ROOT" 12 can initiate generation of a tree-based storing mode topology 14 based on outputting a DAO message (18 of FIG. 1C) specifying itself as the root, topology metrics (e.g., root has highest preference), and that the RPL instance is to be implemented in storing-mode (as described in further detail below, the DIO advertisement message 18 also can include a saturation metric). Each child network device (e.g., "A", "B", and "C") 12 can attach to the root network device "ROOT" 12 in response to detecting the DIO message 18 advertised by the root.

Figure 1B:
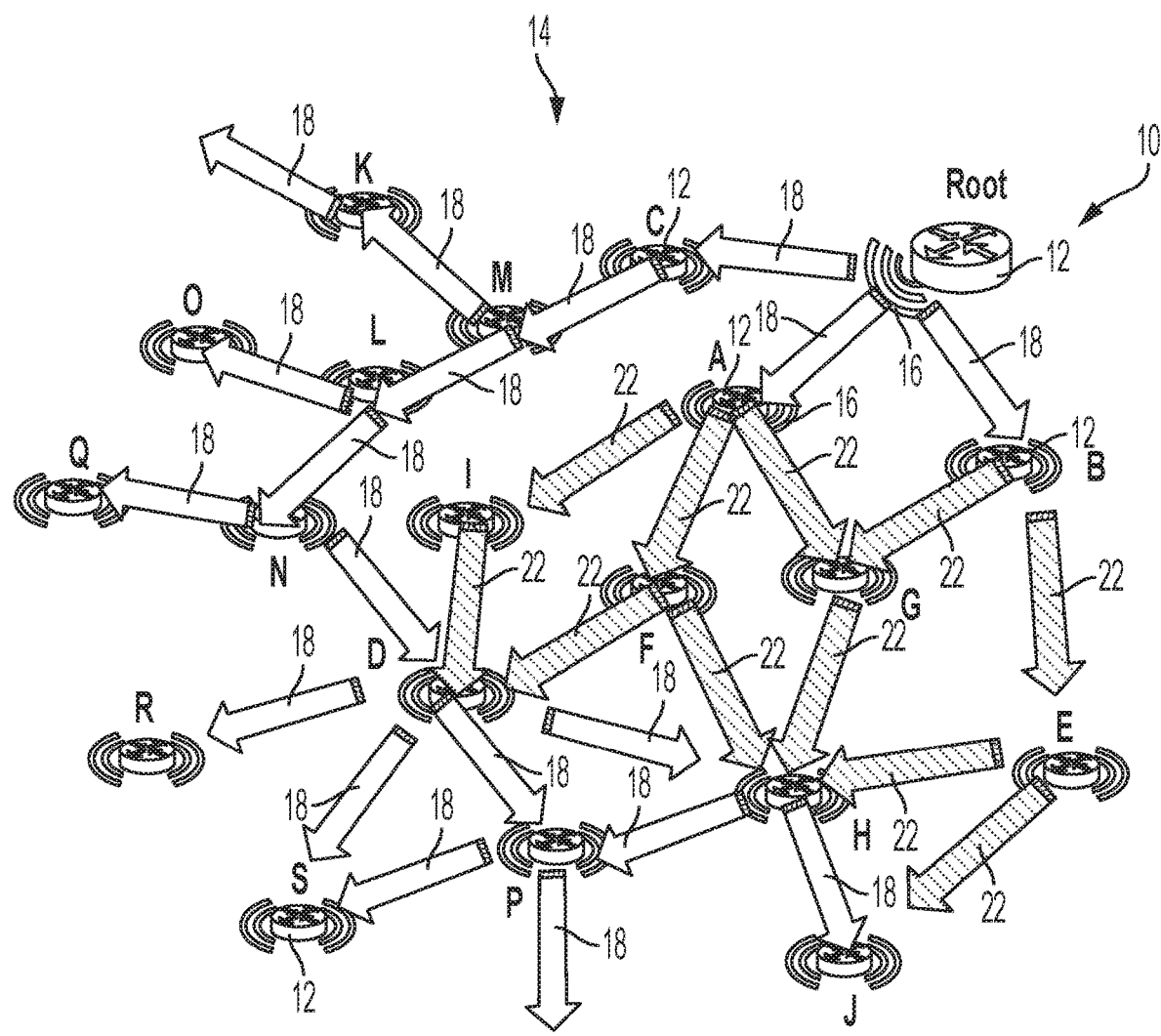
Figure 1C:
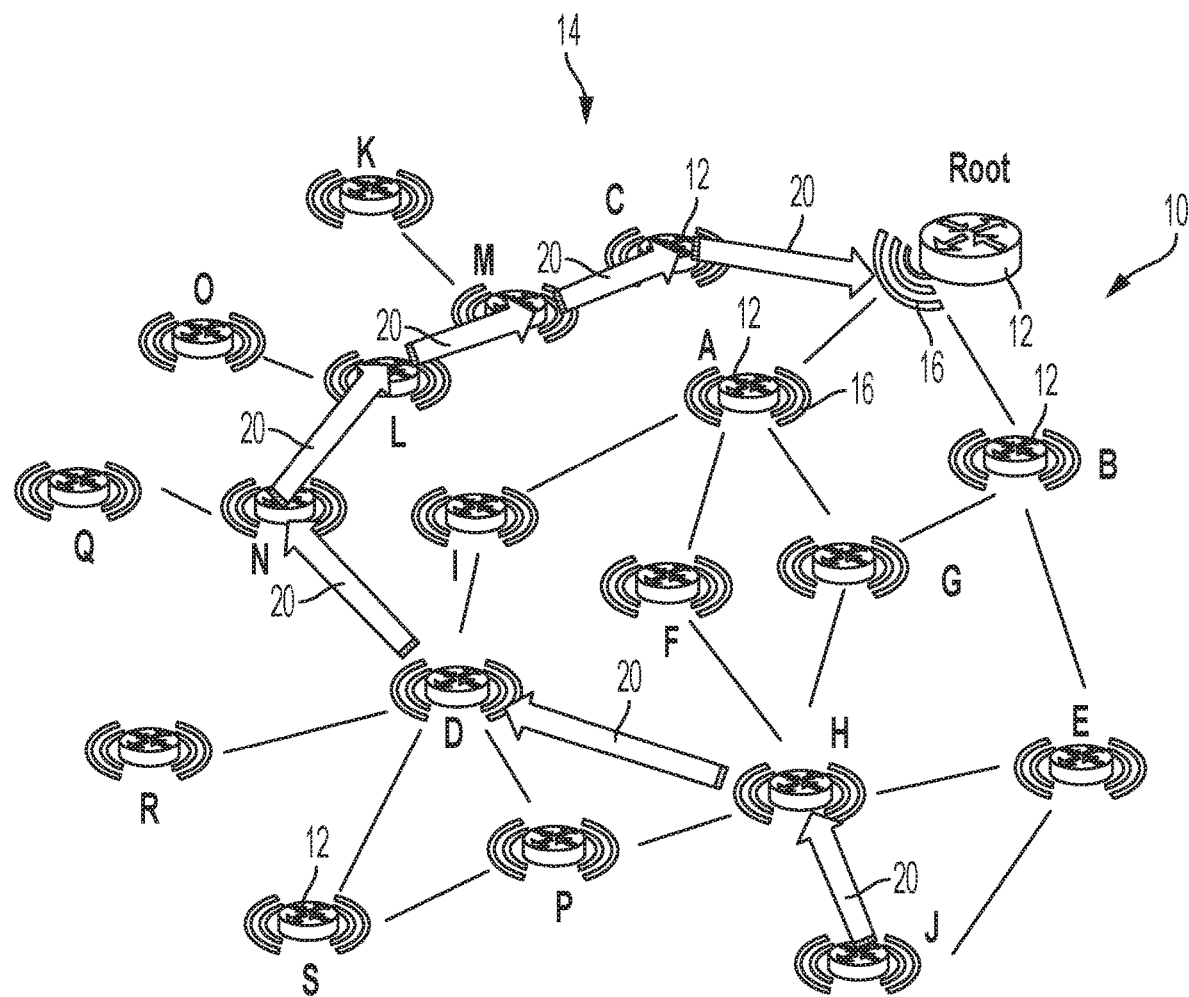
Figure 1D:
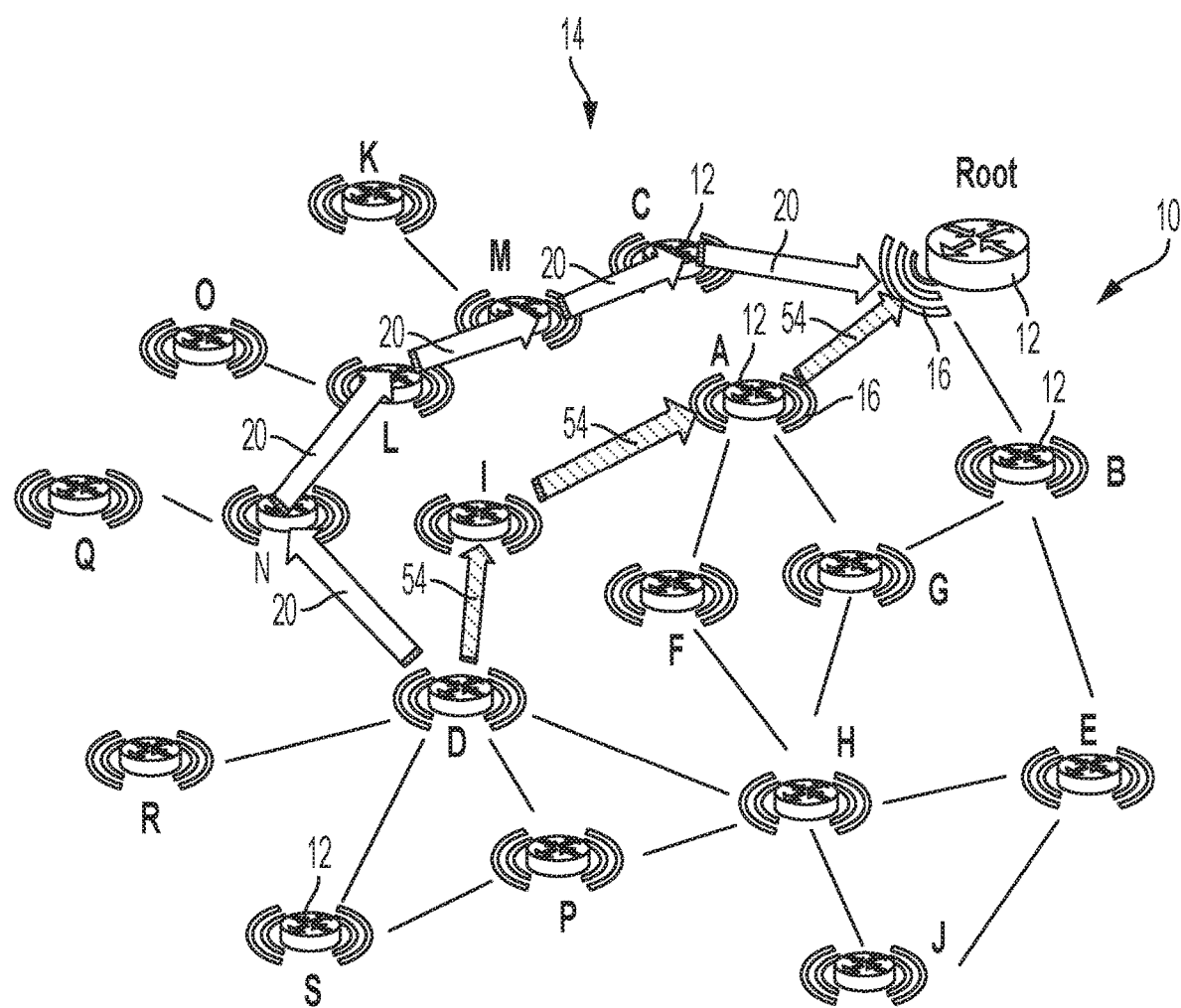

As illustrated in FIG. 1C, each child network device (e.g., "C") also can generate an updated DIO message 18, specifying updated topology metrics (e.g., preference value and/or that the advertising network device "C" is one hop from the root). The propagation of updated DIO messages by the child network devices (e.g., "A", "B", and "C") 12, following attachment to the root network devices, enable other network devices (e.g., "D" through "S") to eventually join the tree-based storing mode topology 14 initiated by the DIO message 18 originated by the root network device "ROOT" 12. As illustrated in FIGS. 1A-1D the root network device "ROOT" 12 is the parent for the directly-attached child network devices "A", "B" and "C", the network device "A" is the parent for the directly-attached child network devices "F", "G" and "I", the network device "B" is the parent for the directly-attached child network devices "E" and "G", the network device "C" is the parent for the child network device "M", etc. As illustrated in FIGS. 1C and 1D (described in further detail below), each attachment in the DAG topology 14 can be illustrated by a line in between two network devices 12.

Each attached child "A", "B", and "C" also can generate and output "upward" (i.e., toward the root network device "ROOT" 12) a Destination Advertisement Object (DAO) message (20 in FIG. 1C) in response to attaching as a child to a parent network device: as illustrated in FIG. 1C, a DAO message 20 generated by an attached RPL child network device can be propagated via its parent network device toward the DAG root network device "ROOT" 12. As described in RFC 6550, the DAO message can specify a "target" IP address or prefix (e.g., an IPv6 address or prefix utilized by the child RPL node), enabling the root network device "ROOT" 12 to establish a downward path for reaching the advertising network device. As described previously, in non-storing mode the DIO advertisement message 18 is propagated upward toward the root network device "ROOT" 12 without any parent network device storing the routes stored in the received DAO message.

A fundamental problem that can be encountered in existing proposals of a tree-based storing-mode topology (fully storing-mode or hybrid storing-mode) is that a constrained network device can become saturated if its constrained memory runs out of free memory space for storage of routes specified in a received advertisement message such as a DAO message. In particular, constrained network devices (e.g., "A", "B", "C") that are closer to the root can be required to store a relatively larger number of routes of attached network devices (e.g., "D" through "S"); however, formation of the tree-based storing mode topology 14 is unpredictable because each child network device executes its own decision on whether to attach to a candidate parent network device based on the topology metrics specified in a DIO message. Hence, a parent network device that is near the constrained network device 12 may encounter saturation, for example having insufficient free route entries for storage of any more routes for reaching child network devices in its sub-DAG.

For example, assume in FIG. 1A that parent network devices "A" and "B" are initially unsaturated: the parent network device "A" remains unsaturated in response to child network devices "F", "G" and "I" having attached and unicast transmitted their respective DAO messages to the parent network device "A"; the parent network device "B" remains unsaturated in response to child network devices "G" and "E" having attached and unicast transmitted their respective DAO messages to the parent network device "B". The network device "H" 12 can attach and unicast transmit to the network device "G" 12 a DAO message in response to the network device "G" 12 receiving from the network device "G" an updated DIO message: the network device "G" 12 can respond to the DAO message from the attached child network device "H" by storing (in its internal route table) the route specified in the DAO message (e.g., the target specifying one or more of an IPv6 address, IPv6 address prefix, and/or multicast group reachable via the attached child network device "H"); the network device "G" 12 also can respond to the DAO message from the attached child network device "H" by unicast transmitting to each of its parent network devices "A" and "B" a corresponding DAO message specifying the target specified in the DAO message from child network device "H" is reachable via the network device "G" 12.

Hence, the "grandparent" network devices "A" and "B" can reach saturation (e.g., insufficient free route entries for storage of any more routes) in response to locally storing the route entry originated by the grandchild network device "H". Hence, if the network device "J" 12 attaches and sends a DAO message (e.g., identifying a route to target network device "J") to the network device "H", the network device "H" can store the route to network device "J" and output a DAO message to its parent network device "G"; the network device "G" also can store the route to network device "J" and output a DAO message to its parent network devices "A" and "B". In this case, however, the saturated parent network devices "A" and "B" would reject the DAO message (specifying the route to network device "J") by transmitting a DAO-Ack rejection message (e.g., a rejection status specifying the saturated parent network device is unwilling to act as parent). Hence, even if the network device "J" were to attach to the network device "E" as a parent, the saturated grandparent "B" 12 would still reject the DAO message specifying the route to network device "J" via "E". Consequently, the only solution that was previously available was for the tree-based storing mode topology 14 to break and attempt reformation using a different topology that does not encounter saturation in the local memories of the parent network devices.

According to example embodiments, each DIO advertisement message 18 can include one or more metrics enabling a child network device to determine whether saturation is encountered by a transmitting constrained network device 12: the metric specified in the DIO advertisement message 18 can be implemented as one or more of a Boolean saturation flag bit indicating whether saturation is encountered (e.g., "0"=no saturation; "1"=saturation); the metric specified in the DIO advertisement message 18 also can be expressed as a number of free route entries (e.g., "FREE_i") that are available for storage via the transmitting constrained network device 12 outputting the DIO advertisement message 18.

Hence, as illustrated in FIG. 1A, the saturated parent network devices "A" and "B" each can output a corresponding DIO message that specifies not only the topology attributes of the tree-based storing mode topology 14, but that also can indicate to a receiving network device that the transmitting parent network device is encountering saturation: in one example, the saturated DIO message 22 can specify the parent network device has determined it is saturated (e.g., saturation flag="1"); in another embodiment, the DIO message output by the saturated parent network devices "A" and "B" specifies the saturation metric in the form of a free route entry, where a receiving child network device (e.g., "E", "F", "G", "I", etc.) can determine the received DIO message is to be designated (i.e., identified) as a saturated DIO message 22.

As described herein, the DIO advertisement message 18 is output by an advertising network device, whereas a receiving network device 12 can designate or conclude that the received DIO advertisement message is a saturated DIO message 22: hence, the designation of a received DIO message 18 as a saturated DIO message 22 is determined by the receiving network device based on the values of the saturation metrics: the saturated DIO message 22 illustrated in the Figures illustrates a designation by a receiving network device that a received DIO message is from a transmitting network device that is saturated (e.g., "FREE_i" below routes required by the receiving network device for storage), whereas the DIO advertisement message 18 illustrates that a receiving network device can determine from the saturation metric(s) that the transmitting network device is not saturated (e.g., saturation flag="0" and/or "FREE_i" larger than routes required by the receiving network device for storage).

Hence, the designation of a saturated DIO message 22 as described herein represents a DIO message 18 that is transmitted by transmitting network device 12 and comprising metrics used by a receiving network device (i.e., a network device receiving the DIO message) to determine that the transmitting network device 12 is encountering saturation and has insufficient free route entries available for storage as required by the receiving network device: hence, reference to the saturated DIO message 22 does not explicitly specify the transmitting network device 12 is encountering saturation unless the saturated DIO message 22 specifies the saturation flag as set (saturation flag="1"). In another embodiment, a separate and distinct "saturation message" can be transmitted by a parent network device encountering saturation, where the saturation message does not contain any topology information as in a DIO advertisement message 18 but includes a saturation flag and/or a metric specifying free route entries.

Further, each parent network device can 12 output updated DIO messages 18 and/or DAO messages 20 as appropriate, for example in response to receiving a DAO message from a child network device. Hence, child network devices "E", "F", "G", and "I" can determine that a parent network device "A" and/or "B" has transitioned from no saturation to a state in which the parent network device "A" and/or "B" can encounter saturation (e.g., if any additional routes above a determined number is sent to the parent network device).

Consequently, the receiving child network device (e.g., "E", "F", "G", "I", etc.) can propagate updated DIO messages that can determined by the receiving network devices to be saturated DIO messages 22, illustrated in FIG. 1B. Hence, new constrained network devices 12 (e.g., "D", "J" through "L" and "N" through "S") seeking a new parent can avoid the saturation encountered by the network devices "A" and "B" based on determining the received DIO messages are saturated DIO messages 22, and attach to an alternate parent network device based on detecting alternate parents advertising DIO messages determined by the new parent devices to be non-saturated DIO messages 18. As illustrated in FIG. 1C, the network device "J" can avoid the saturated network devices "A" and "B" via the DIO messages 18 propagated along non-saturated path "ROOT-C-M-L-N-D-H".

As described below, the existing attached child network devices (e.g., "E", "F", "G", "I") can respond to detecting the received DIO message 18 is a saturated DIO message 22 by eliminating saturation encountered by the saturated parent network devices "A" and/or "B", based on moving at least a portion of the stored routes from the saturated parent network devices "A" and/or "B", described below.

Figure 2:
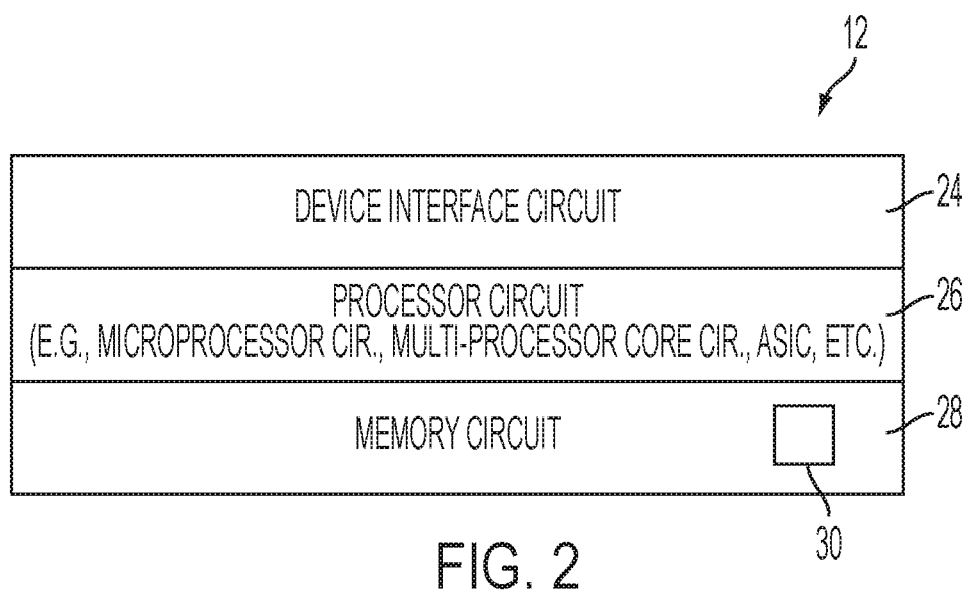
FIG. 2 illustrates an example implementation of any one of the network devices of FIG. 1, according to an example embodiment.

FIG. 2 illustrates an example implementation of any one of the devices 12 of FIGS. 1A-1D, according to an example embodiment. Each apparatus 12 is a physical machine (i.e., a hardware device) configured for implementing network communications with other physical machines 12 via the network 10. The term "configured for" or "configured to" as used herein with respect to a specified operation refers to a device and/or machine that is physically constructed and arranged to perform the specified operation. Hence, the apparatus 12 is a network-enabled machine implementing network communications via the network 10.

Each apparatus 12 can include a device interface circuit 24, a processor circuit 26, and a memory circuit 28. The device interface circuit 24 can include one or more distinct physical layer transceivers for communication with any one of the other devices 12; the device interface circuit 24 also can include an IEEE based Ethernet transceiver for communications with the devices of FIG. 1 via any type of data link (e.g., a wired or wireless link, an optical link, etc.). As described below, the device interface circuit 24 can be configured for receiving a DIO advertisement message 18 and/or a DAO advertisement message 20; the device interface circuit 24 also can be configured for transmitting a DIO advertisement message 18, a DAO advertisement message 20, and/or a saturated DIO message 22 (if the saturation flag is set), as described herein. The processor circuit 26 can be configured for executing any of the operations described herein, and the memory circuit 28 can be configured for storing any data or data packets as described herein; for example, the memory circuit 28 can be configured for storing a data structure 30 comprising route entries storing respective routes for reaching respective destinations in the tree-based storing mode topology 14, where the destinations are obtained from a received DAO advertisement message 20.

Any of the disclosed circuits of the devices 12 (including the device interface circuit 24, the processor circuit 26, the memory circuit 28, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 28) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 28 can be implemented, for example, using a non-volatile memory such as a programmable read only memory (PROM) or an EPROM, and/or a volatile memory such as a DRAM, etc .
. . .

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 28 can be implemented dynamically by the processor circuit 26, for example based on memory address assignment and partitioning executed by the processor circuit 26.

Figure 3A:
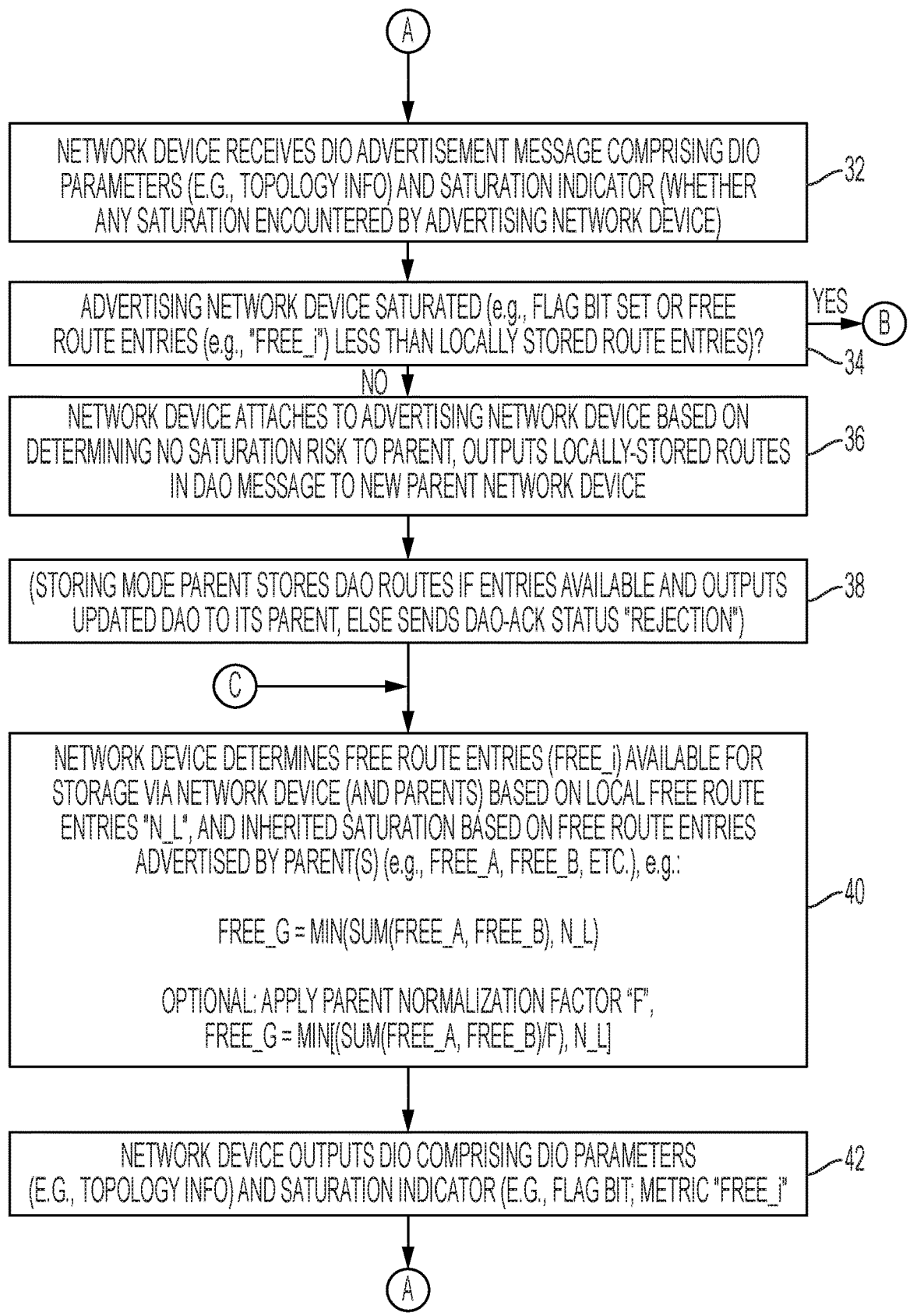
FIGS. 3A-3C illustrate an example method of a RPL child network device eliminating saturation encountered by a RPL storing mode parent network device, according to an example embodiment.
Figure 3B:
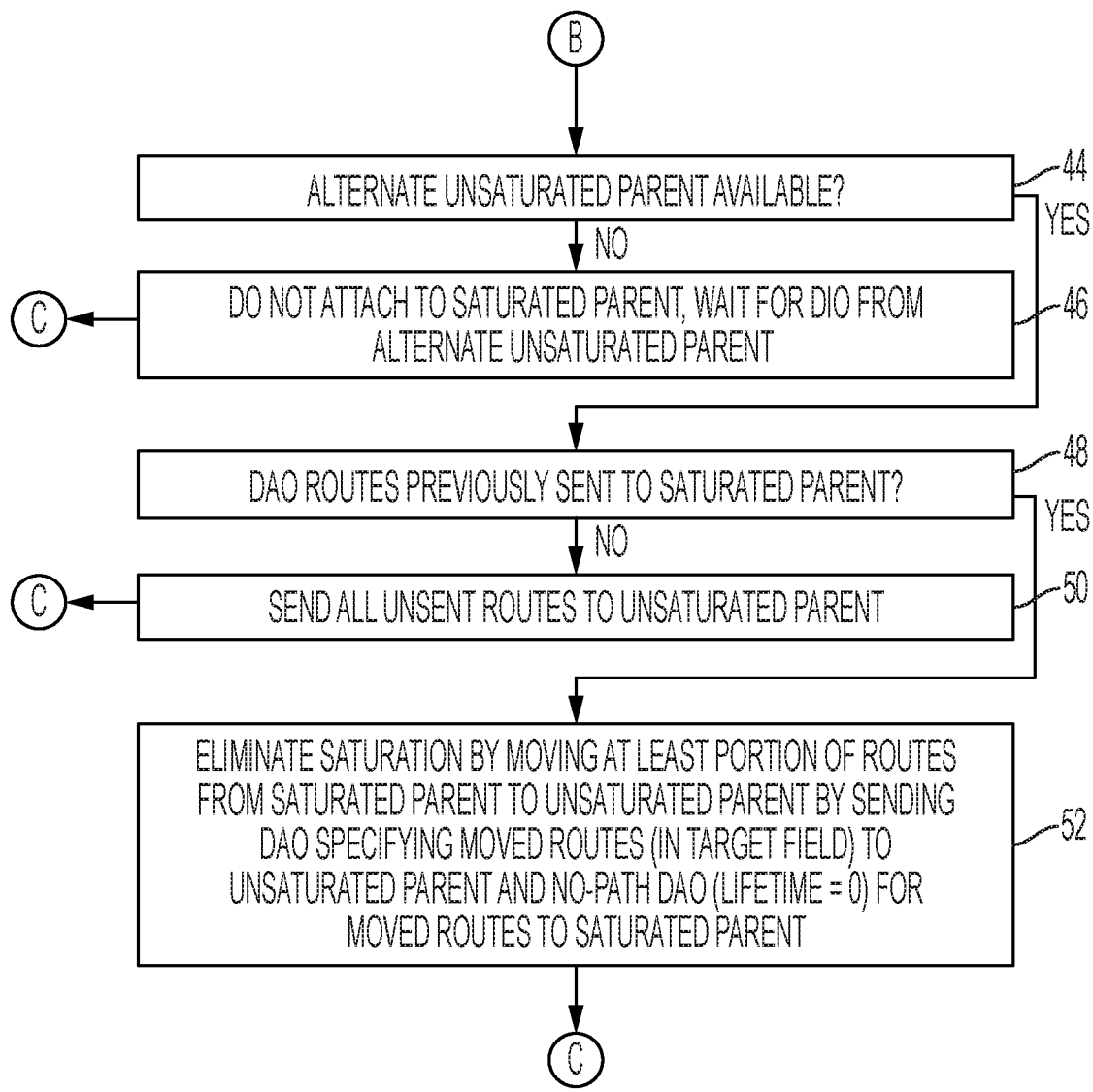
Figure 3C:
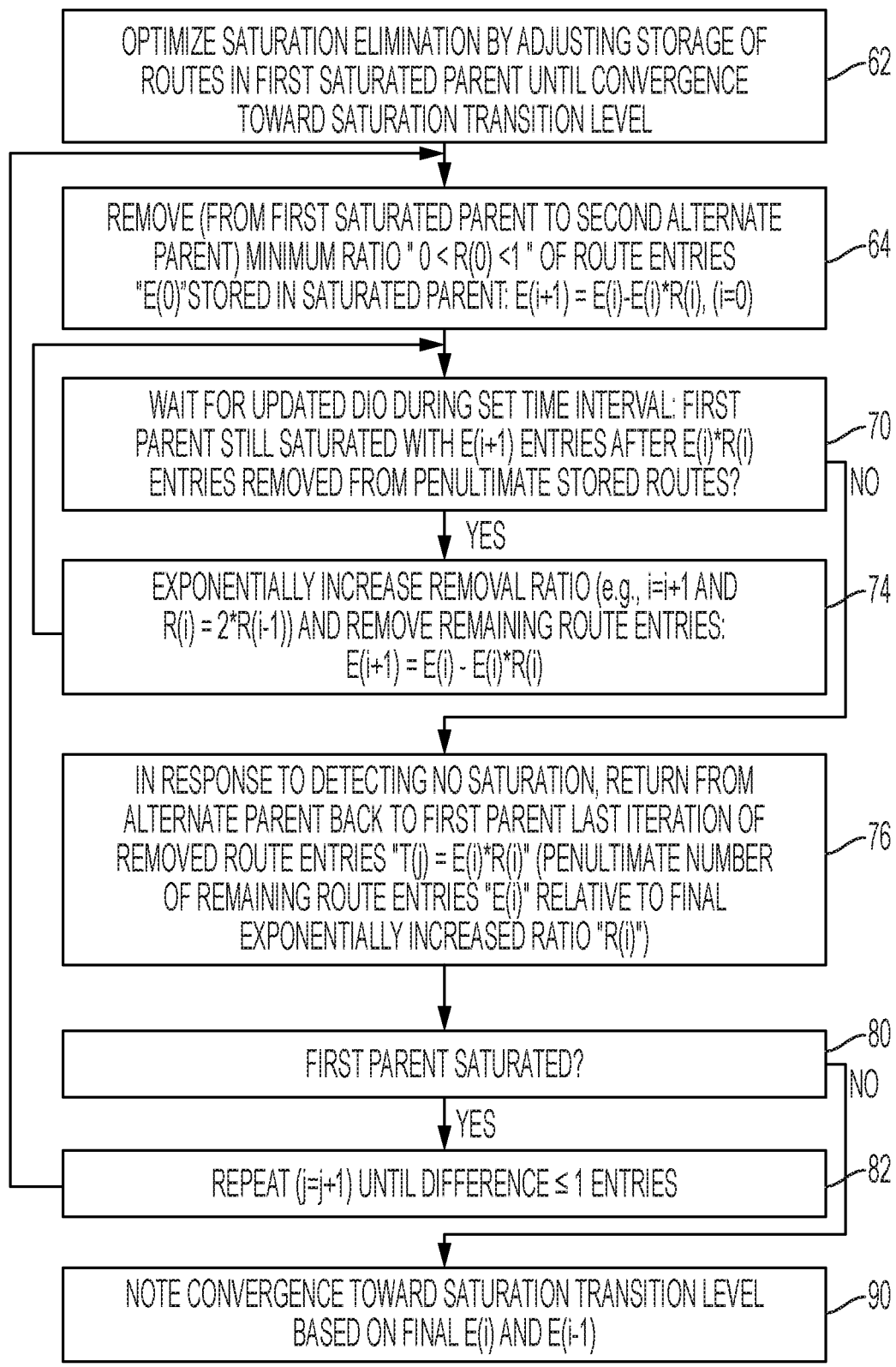

FIGS. 3A-3C illustrate an example method of a RPL child network device eliminating saturation encountered by a RPL storing mode parent network device, according to an example embodiment.

Figure 4:
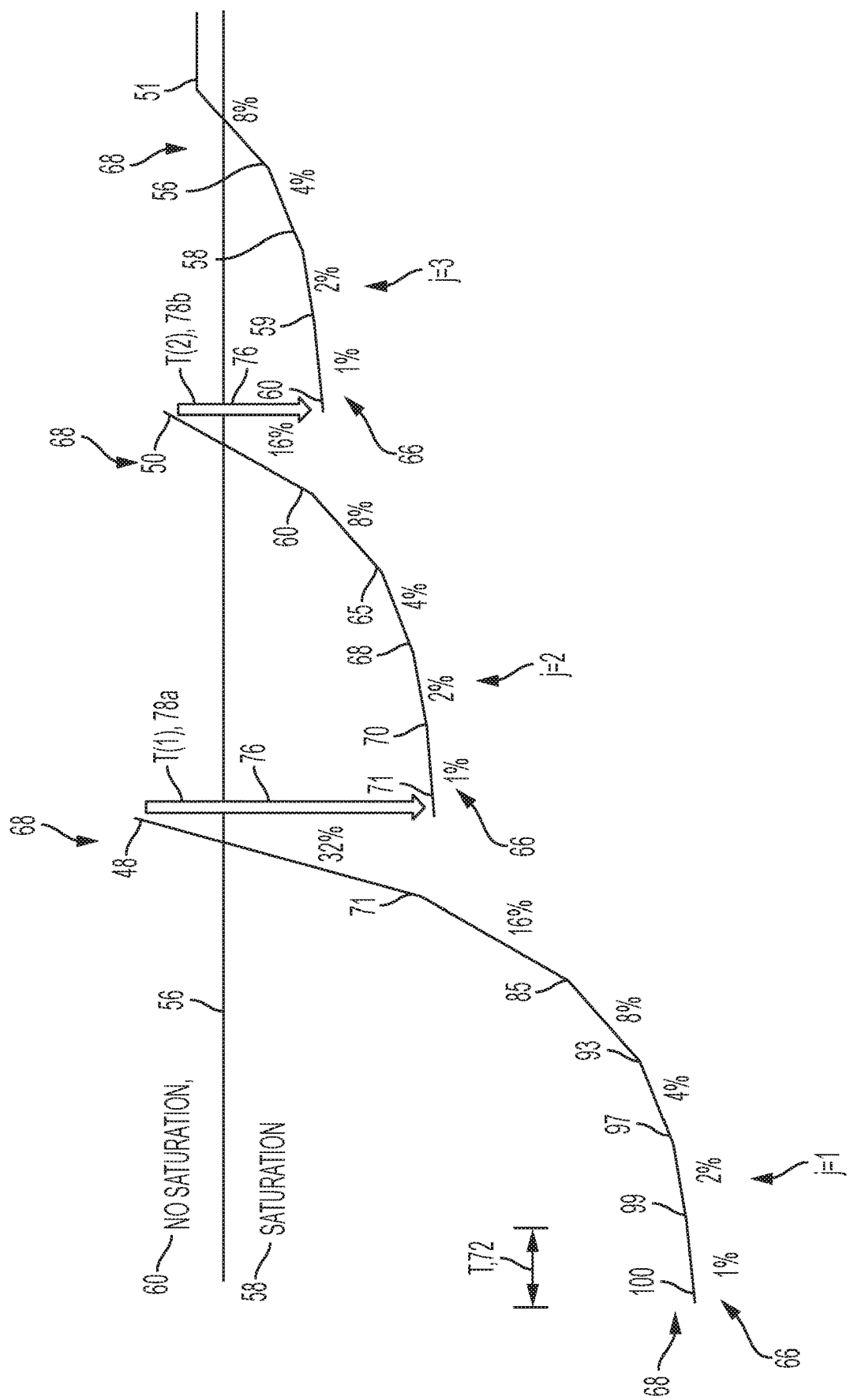
FIG. 4 illustrates an example of a RPL child network device eliminating saturation based on dynamically adjusting storage of routes in a RPL storing mode parent network device up to a determined saturation transition level, according to an example embodiment.

FIG. 4 illustrates an example of a RPL child network device eliminating saturation based on dynamically adjusting storage of routes in a RPL storing mode parent network device up to a determined saturation transition level, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the device interface circuit 24 of a constrained network device 12 (e.g., any one of the network devices "A" through "S") in operation 32 can receive a DIO message (e.g., the DIO advertisement message 18) specifying DIO parameters as specified in RFC 6550, for example topology-based parameters associated with the tree-based storing mode topology 14; the DIO message also can include a saturation indicator and/or saturation metric that can be used by the receiving constrained network device 12 to determine whether the network device transmitting the DIO message (i.e. the transmitting network device) is encountering saturation. As used herein the term "encountering saturation" does not require the transmitting network device to explicitly specify it is encountering saturation, rather the DIO message contains metrics to enable the receiving network device to determine whether the transmitting network device is "encountering saturation" in that the transmitting network device has insufficient memory capacity in its memory circuit 28 to accommodate the storage requirements for additional route entries 30 as required by the receiving network device.

Hence, processor circuit 26 of a receiving network device (e.g., "G") 12 in operation 34 can determine whether an advertising network device (e.g., "A") is encountering saturation based on determining whether a saturation flag is set (e.g., saturation flag="1"). The processor circuit 26 of a receiving network device (e.g., "G") 12 in operation 34 also can determine an advertising network device (e.g., "A") is encountering saturation based on determining whether the advertising network device has sufficient number of free route entries for storage of route entries via the advertising network device: as described below, the "sufficient number of free route entries for storage of route entries via the advertising network device" can refer not only to the number of free route entries within the advertising network device, but also to the availability of free route entries in grandparent network devices that "inherit" route entries from child network devices.

In particular, the processor circuit 26 of the receiving network device (e.g., "G") 12 in operation 34 can determine the number (e.g., "N_STORED") of existing locally-stored route entries 30 in its corresponding memory circuit 28, and determine whether the free route entry metric (e.g., "FREE_i=FREE_A", i=A) specified in the received DIO message is less than the number "N_STORED" of existing locally-stored route entries 30 in its corresponding memory circuit 28. If in operation 34 the processor circuit 26 of the receiving network device (e.g., "G") 12 determines the free route entry metric (e.g., "FREE_A") specified in the received DIO message is less than the number "N_STORED" of existing locally-stored route entries 30 in its corresponding memory circuit 28, the processor circuit 26 of the receiving network device (e.g., "G") 12 in operation 34 can determine the DIO message is a saturated DIO message 22 indicating the advertising network device (e.g., "A") is encountering saturation, described in further detail below with respect to FIG. 3B.

If in operation 34 the processor circuit 26 of the receiving network device (e.g., "G") 12 determines the free route entry metric (e.g., "FREE_A") specified in the received DIO message is greater than the number "N_STORED" of existing locally-stored route entries 30 in its corresponding memory circuit 28, the processor circuit 26 of the receiving network device (e.g., "G") 12 in operation 34 can determine the advertising network device (e.g., "A") is not encountering saturation, and in response the processor circuit 26 of the receiving network device (e.g., "G") 12 in operation 36 can attach to the advertising network device (e.g., "A") as a child network device.

The processor circuit 26 of the child network device (e.g., "G") 12 in operation 36 can attach to its new parent network device (e.g., "A") 12, and can generate and output a DAO advertisement message 20 specifying one or more routes identified in the route entries 30 in the corresponding memory circuit 28 of the child network device (e.g., "G") 12. The storing mode parent network device (e.g., "A") 12 in operation 38 can store the one or more routes specified in the DAO advertisement message 20 in its corresponding memory circuit 28 as respective route entries 30, and can reply with a DAO acknowledgment message (if there are insufficient free route entries available in the parent network device 12, the parent network device (e.g., "A") 12 can reject the DAO request based on generating an outputting a DAO acknowledgment message specifying a "rejection" status). The storing mode parent network device (e.g., "A") 12 also can respond to storage of the route entries by generating and outputting an updated DAO message to its parent network device (e.g., the root network device "ROOT" 12).

The processor circuit 26 of the child network device (e.g., "G") 12 in operation 40 can generate an updated DIO advertisement message 18 that specifies the saturation metric based on determining the free route entries "FREE_i" (e.g., "FREE_G") that are available for storage via the child network device (e.g., "G") 12 in the sub-DAG established by its parent network device(s) (e.g., "A"). For example, the processor circuit 26 of the child network device (e.g., "G") 12 in operation 40 can determine its local free route entries "N_L" from the amount of free entries available in its memory circuit 28 relative to the locally-stored route entries 30; the processor circuit 26 of the child network device (e.g., "G") 12 also can determine an inherited saturation based on the free route entries "FREE_i" advertised by one or more parent network devices.

For example, if the child network device (e.g., "G") 12 is attached only to the parent network device "A" 12 as part of initial formation of the tree-based storing mode topology 14, the processor circuit 26 of the child network device "G" in operation 40 can determine the saturation metric "FREE_G" as a minimum between the corresponding local free route entries "N_L" and the specified free route entries "FREE_A" specified in the DIO message, i.e., "FREE_G=MIN(FREE_A, N_L)".

If the child network device (e.g., "G") 12 is attached to two parent network device (e.g., "A" and "B") 12 (e.g., based on also having received a DIO advertisement message 18 from the network device "B"), the processor circuit 26 of the child network device "G" in operation 40 can determine the saturation metric "FREE_G" as a minimum between the corresponding local free route entries "N_L" and a sum of the specified free route entries "FREE_A" and "FREE_B" specified in the DIO message, i.e., "FREE_G=MIN(SUM(FREE_A, FREE_B), N_L)". In this example, the child network device "G" can store at least a first portion of received route entries in the parent network device "A" (based on the corresponding free route entries "FREE_A"), and a second portion of the received route entries in the parent network device "B" (based on the corresponding free route entries "FREE_B"), enabling the child network device "G" to execute distributed storage of received routes from child network devices 12. Hence, the child network device can determine the free route entries available for storage based on determining the minimum availability relative to the first and second numbers of free route entries "FREE_A", "FREE_B" of the first and second parent network devices "A" and "B", respectively, relative to the local free route entries "N_L". This example, however, assumes the grandparent device has sufficient memory resources for storing the sum of entries among the parent network devices "A" and "B", e.g., "SUM(FREE_A, FREE_B)": although the root network device "ROOT" 12 may be configured for storing a substantially large number of routing entries, a common parent implemented as a constrained network device and located further down in the tree-based storing mode topology 14 may have insufficient resources for storing routes from grandchildren in its sub-DAG.

Hence, the child network device (e.g., "G") 12 in operation 40 also can apply a parent normalization factor "F" that is set relative to the number of parent network devices (e.g., "A", "B") that is utilized by the child network device "G", resulting in a normalized parent free route entry value, where: "FREE_G=MIN[SUM(FREE_A, FREE_B)/F), N_L]". Hence, the processor circuit 26 of the child network device "G" in operation 40 can normalize the sum of parent free route entries based on dividing the sum "SUM(FREE_A, FREE_B)" of the first and second numbers of free route entries "FREE_A", "FREE_B" by the normalization factor "F". The normalization factor "F" can be set based on the number of parent network devices: for example, the normalization factor can be set to "F=1" if there is one and only one parent device, "F=2" if the child network device has two-three parent network devices, or "F=3" if the child network device has four-five parent network devices: a non-integer normalization factor "F" also can be used, and different normalization factor values can be determined by a network administrator based on topological factors, policies, constraints, etc. in the data network 10 (the factors used to select the normalization factor "F" also can be specified in the DIO advertisement message 18).

Hence, processor circuit 26 of the child network device (e.g., "G") 12 in operation 40 can generate the free route entries "FREE_G" as the minimum between the normalized parent free route entry value "SUM(FREE_A, FREE_B)/F" or the local free route entries "N_L".

The processor circuit 26 of the child network device (e.g., "G") 12 in operation 42 can output an updated DIO advertisement message 18 that specifies metrics indicating whether saturation is encountered, for example as a flag bit and/or the free route entry metric "FREE_G". Hence, the updated DIO advertisement message 18 can be propagated throughout the data network 10 for establishing the tree-based storing mode topology 14, while enabling network devices to determine whether to join the advertising network device as a child based on the amount of free route entries available for storage via the advertising child network device (e.g., "G") 12. As described previously, the network device "H" also can execute operations 32 through 42 in response to receiving the DIO advertisement message 18 from the advertising network device "G".

Assume that after the child network device (e.g., "F", "G", and/or "I") 12 has attached to the parent network devices "A" and/or "B", and after the network device "H" has attached to the network device "G", the parent network devices "A" and/or "B" begin to have a reduced number of free route entries for storage of routes for new child network devices. Hence, the parent network devices "A" and/or "B" can output updated DIO messages 18: hence, any one of the child network devices (e.g., "F", "G", and/or "I") can determine in operation 34 that the advertising network device "A" and/or "B" is saturated, e.g., the corresponding free route entry metric "FREE_A" and/or "FREE_B" is less than the locally stored route entries (and/or less than the corresponding local free route entries "N_L"), thereby determining the DIO advertisement message 18 represents a saturated DIO message 22 from a saturated parent.

Referring to FIG. 3B, if in operation 44 a network device has no alternate unsaturated parents available, the processor circuit 26 of the child network device in operation 46 can determine not to attach to the saturated parent by not sending a DAO message forwarding any routes, and can wait for another DIO advertisement message 18 from an alternate parent network device. The processor circuit 26 of the constrained network device 12 in operation 46 can, however, store the information from the DIO message 18 (designated as a saturated DIO message 22) (e.g., a candidate parent list) in its memory circuit 28 and output an updated saturated DIO message 22 (e.g., with saturation flag set) in operations 40 and 42 of FIG. 3A, enabling other neighboring network devices 12 to learn of the saturation to avoid the saturated network devices. Hence, the child network devices "E", "F", "G", and "I" can output updated saturated DIO messages 22 (e.g., with the saturation flag set), illustrated in FIG. 1B, causing the neighboring network devices "D", "H", and "N" to avoid the sub-DAG created by the saturated network devices "A" and "B" (and advertised by the network devices "E", "F", "G", and "I") and wait for alternate DIO messages generated by the network devices "C", "M", "L", "N", and "D".

Hence, in response to the network device "D" receiving the DIO advertisement message 18 from the non-saturated network device "N", the network device "D" can output an updated DIO advertisement message 18 in operation 42 (and output a DAO advertisement message 20 to the parent network device "N"): in response to the network device "H" receiving in operation 34 the DIO advertisement message 18 advertised by the non-saturated network device "D", the network device "H" can attach to the network device "D", output a DAO advertisement message 20 to its new parent network device "D" in operation 36, and output in operations 40 and 42 an updated DIO advertisement message 18 that can be detected by the network device "J" 12.

Hence, as illustrated in FIG. 1B, the network device "J" in operation 34 can detect the DIO advertisement message 18 is from an unsaturated parent device "H", and in response can attach to the network device "H" and send in operation 36 a DAO advertisement message (20 of FIG. 1C). As described previously with respect to FIG. 1C, the DAO advertisement message 20 generated by the network device "J" is propagated toward the root network device "ROOT" 12 via the path of unsaturated constrained network devices "H-D-N-L-M-C-ROOT".

As illustrated in FIG. 1D, assume the network device "D" detects the parent device "I" is a saturated parent device "I" (based on the network device "D" designating the received DIO message 18 as a saturated DIO message 22 in FIG. 1B), and the network device "D" also detects the parent device "N" as an unsaturated parent network device (based on the network device "D" receiving the DIO advertisement message 18 from the network device "N" as in FIG. 1B). Hence, the network device "D" in operation 44 of FIG. 3B can respond to the identification of the saturated parent network device "I" in operation 48 based on whether any DAO routes have been sent to the saturated parent network device "I". If in operation 48 no local route entries have been sent yet by the network device "D" to the saturated parent network device "I", the network device "D" in operation 50 can send all unsent routes via a DAO advertisement message 20 to the unsaturated parent network device "N", as illustrated in FIG. 1C.

If in operation 48 the network device "D" determines it has previously sent routes via one or more DAO messages 20 to the saturated parent network device "I", the processor circuit 26 of the network device "D" in operation 52 can eliminate saturation encountered by the saturated parent network device "I" based on moving at least a portion of its routes from the saturated parent network device "I" to the unsaturated parent network device "N". In one embodiment, the network device "D" can determine to move at least a first portion "N_MOVE" of route entries from the saturated parent network device "I" based on determining the number of locally-stored route entries "N_STORED" minus the number of free route entries available for storage via the saturated parent network device "I", e.g., "N_MOVE=N_STORED−FREE_I".

The network device "D" in operation 52 can move the first portion "N_MOVE" of route entries based on generating and outputting to the unsaturated parent network device "N" a DAO advertisement message 20 specifying the "N_MOVE" route entries (in one or more target fields of the DAO advertisement message 20); the network device "D" in operation 52 also can remove the first portion "N_MOVE" of route entries from the saturated parent network device "I" 12 based on generating and outputting to the saturated parent network device "I" a "No-Path DIO" message 54 specifying the "N_MOVE" route entries and a "zero lifetime" for each of the "N_MOVE" route entries. The no-path DIO message 54 causes the saturated parent network device "I" 12 to remove the specified "N_MOVE" route entries from its memory circuit 28, freeing up memory space in the parent network device "I" 12; the no-path DIO message 54 also can be propagated toward the root network device "ROOT" 12 via the saturated parent network device "A", causing the saturated parent network device "A" to clear the "N_MOVE" route entries from its memory circuit 28, and causing the root network device "ROOT" 12 to clear the "N_MOVE" route entries from its memory circuit 28. Note, however, that the root network device "ROOT" 12 still has a path to reach the network device "D" via its child network device "C" based on the DAO advertisement message 20 propagated via the path "D-N-L-M-C-ROOT".

Hence, the network device "D" in operation 52 can eliminate the saturation encountered by network devices "I", "A" (and possibly the root network device "ROOT" 12) based on moving at least the "N_MOVE" route entries to its unsaturated parent network device "N". Similar operations can be executed by the network devices "H" and "J" that eliminate the saturation encountered by the network devices "A", "B", "E", "F" and "G" based on moving their respective routes from the saturated parents "A" and "B" (via "F", "G" and "E") to the unsaturated parent network device "D".

Hence, the example embodiments enable the avoidance of saturated network devices by new child network devices, and the elimination of saturation by existing child network devices.

FIGS. 3C and 4 illustrate an example implementation of the saturation elimination in operation 52 of FIG. 3B, where a child network device can rebalance stored routes between parent network devices based on determining a saturation transition level in a saturated parent network device. A child network device can determine a saturation transition level (56 of FIG. 4) that identifies a transition between a saturation state 58 and a nonsaturated state 60 encountered in a parent network device. As described below, the determination of a saturation level 56 enables a child network device 12 to adjust (i.e., rebalance) in operation 62 storage of a number of routes in the saturated parent network device based on: repeating a sequence of successively removing a larger portion of route entries 30 and detecting from updated DIO messages the response by the parent network device to the removal of the route entries 30, until detecting the transition from the saturation state 58 to the nonsaturated state 60 (based on evaluating updated DIO messages from the parent network device); returning to the (now-unsaturated) parent network device a portion of the previously-removed route entries 30; and removing smaller portions of the route entries 30 until detecting another transition from the saturation state 58 to the nonsaturated state 60, until the routes stored in the parent network device converge toward the saturation level 56.

For example, the processor circuit 26 of the child network device (e.g., "D") 12 in operation 64 can set a prescribed time interval "T" 72 (e.g. ten seconds for a fast network, ten minutes for a slow network) that enables the child network device "D" 12 to determine if removal of route entries 30 from a saturated parent network device (e.g., "I") causes the saturated parent network device to transition from the saturation state 58 to the nonsaturated state 60. For example, FIG. 4 illustrates that the child network device (e.g., "D") 12 has initially stored an initial number of route entries "E(0)", namely one hundred (100) route entries 68, i.e., "E(0)=100" 68.

The processor circuit 26 of the child network device "D" 12 in operation 64 can initially remove (for iteration i=0) a prescribed minimum ratio (e.g., "R(0)=0.01") 66 of route entries "E(0)=100" 68 stored in the saturated parent network device "I" (based on outputting an appropriate no-path DIO message 54), causing the saturated parent network device "I" to remove the specified route entry resulting in the remaining number of route entries "E(1)=99" 68 in the saturated parent network device "I", i.e., E(1)=E(0)−E(0)*R(0)", where the character "*" is a multiplication operation.

The child network device "D" 12 in operation 70 can wait for the set time interval "T" 72 to determine if a received DIO advertisement message 18 from the saturated parent network device "I" 12 indicates the saturated parent network device "I" 12 has transitioned from the saturation state 58 to the nonsaturated state 60 with the remaining number of "E(i+1)" entries 68 after removal of the E(i)*R(i) entries, as described above with respect to operation 34 in FIG. 3A. As illustrated in FIG. 4, the remaining entries "E(1)=99" 68 still cause the saturated parent network device "I" 12 to remain in the saturation state 58. Hence, since the saturated parent network device "I" 12 is still encountering saturation, the child network device "D" 12 can successively remove in operation 74 a corresponding successively exponentially increasing ratio 66 of stored entries, e.g., "R(i)=2*R(i−1)", such that the ratio "R(0)=0.01" 66 is doubled to "R(1)=0.02" 66: the ratio "R(1)=0.02" is used to remove the corresponding percentage of the remaining route entries "E(1)=99" 68, i.e., "E(i+1)=E(i)−E(i)*R(i)" such that the remaining number of route entries "E(2)=97" (or "E(2)=E(1)−E(1)*R(1)", i.e., "97=99-2"). As apparent from the foregoing, some rounding is expected to generate an integer number of routes to be removed.

The child network device "D" 12 in operation 70 can wait for the set time interval "T" 72 to determine if a received DIO advertisement message 18 from the saturated parent network device "I" 12 indicates the saturated parent network device "I" 12 has transitioned from the saturation state 58 to the nonsaturated state 60 with the remaining number of entries "E(2)=97" 68. As shown in FIG. 4, the child network device "D" 12 can determine in operation 70 that saturated parent network device "I" 12 can still remain in the saturation state 58 with the remaining number of entries "E(2)=97" 68: the processor circuit 26 of the child network device "D" 12 repeats operations 70 and 72 by exponentially increasing the ratio 66 of remaining entries 68, until the child network device "D" 12 receives a DIO advertisement message 18 indicating the parent network device "I" 12 has transitioned to the nonsaturated state 60.

As illustrated in FIG. 4, the child network device "D" 12 successively removes 4% of the ninety-seven (97) remaining entries 68, 8% of the ninety-three (93) remaining entries 68, 16% of the eighty-five (85) remaining entries 68, and 32% of the remaining seventy-one (71) remaining entries 68, before the parent network device "I" 12 transitions to the nonsaturated state 60 with forty-eight (48) remaining entries 68 that were originally sent to the parent network device "I" 12 by the child network device "D" 12. As described previously, the child network device "D" 12 moved a total of fifty-two (52) route entries 30 to the nonsaturated parent network device "N" via DAO messages to the nonsaturated parent network device "N" and no-path DIO message 54*s* to the saturated parent network device "I" 12 (of the original one hundred (100) route entries 68 stored by the child network device "D" 12), resulting in a total of forty-eight (48) remaining entries 68 in the parent network device "I" 12. The last seventy-one (71) remaining entries that were reduced before the transition by the saturated parent network device "I" 12 from the saturation state 58 to the nonsaturated state 60 is referred to as the penultimate number of remaining routes, and the final percentage of 32% 66 is referred to as the final exponentially increased ratio.

In response to the processor circuit 26 of the child network device "D" 12 detecting the nonsaturated state 60 of the parent network device "I" 12 in operation 76 following the first iteration (j=1) of removing the routes from the saturated parent network device "I" 12, the processor circuit 26 of the child network device "D" 12 in operation 76 can return from the alternate parent "N" back to the parent network device "I" 12 a first returned number of routes "T(1)=23" 78a corresponding to the penultimate number of remaining routes (seventy-one (71) 68) relative to the final exponentially increased ratio of 32%, which also can be expressed as "T(1)=23=(0.32)*71" (rounded up to the integer "23"). In response to the processor circuit 26 of the child network device "D" 12 in operation 76 returning the first returned number "T(1)=23" of routes 78 to the parent network device "I" 12, the processor circuit 26 waits in operation 80 for the next set time interval "T" 72 to determine from the next DIO advertisement message 18 output by the parent network device "I" 12 whether the parent network device "I" 12 is still in the nonsaturated state 60, or whether the parent network device "I" 12 has returned to the saturation state 58.

If in operation 80 the processor circuit 26 of the child network device "D" 12 determines the parent network device "I" 12 has returned to the saturation state 58, the processor circuit 26 of the child network device "D" 12 in operation 82 can repeat the successive removal operations (j=2) as described with respect to operations 64, 70, 74, 76, and 80 to determine the next transition by the saturated parent network device "I" 12 from the saturation state 58 to the nonsaturated state 60. As illustrated in FIG. 4, the next iteration (j=2) illustrates the processor circuit 26 of the child network device "D" 12 successively removing from the saturated parent network device "I" 12 1% of the seventy-one (71) stored entries 68, 2% of the seventy (70) stored entries 68, 4% of the sixty-eight (68) stored entries 68, 8% of the sixty-five (65) of the stored entries 68, 16% of the sixty (60) stored entries 68, resulting in fifty (50) remaining entries 68 after the second iteration (j=2) that causes the parent network device "I" 12 to transition from the saturation state 58 to the nonsaturated state 60. Hence, in this iteration (j=2) the last sixty (60) remaining entries 68 that were reduced before the transition by the saturated parent network device "I" 12 from the saturation state 58 to the saturation level 56 is referred to as the penultimate number of remaining routes, and the final percentage of 16% 66 is referred to as the final exponentially increased ratio.

Hence, the child network device "D" 12 repeats operation 76 by returning back to the parent network device "I" 12 a second returned number of routes "T(2)=10" 78b, corresponding to the penultimate number of remaining routes (sixty (60) 68) relative to the final exponentially increased ratio of 16%, and in response can detect after the set time interval "T" 72 that the parent network device "I" 12 has returned from the nonsaturated state 60 to the saturation state 58. Hence, the processor circuit 26 of the child network device "D" 12 in operation 82 can repeat the iteration (j=3), resulting in the successive removal by the child network device "D" 12 of 1% of sixty (60) stored entries 68, 2% of fifty-nine (59) stored entries 68, 4% of fifty-eight (58) stored entries 68, and 8% of fifty-six (56) stored entries 68, which causes the saturated parent network device "I" 12 to transition from the saturation state 58 to the saturation level 56. As apparent from operation 82, the child network device "D" 12 can halt the operations based on detecting in operation 82 (which can interrupt operation 76, as appropriate) the detected convergence between fifty (50) entries (during iteration j=2) and fifty-one entries (during iteration j=3). Hence, the processor circuit 26 of the child network device "D" 12 can note in operation 90 the convergence between the nonsaturated states for fifty-one (51) stored entries, versus a saturated state for fifty-six (56) entries. An additional iteration (j=j+1) can be executed if additional precision is desired by the child network device to more precisely identify the saturation level 56. The child network device also can continue to "probe" the unsaturated parent network device "I" 12 by "slowly" transferring a stored route (e.g., one stored route after every set time interval "T" 72, or exponentially slowing down the rate of transfer) in order to continuously test the saturation level 56; hence, the child network device can continue to transfer a stored route entry until the unsaturated parent network device I" transitions to the saturation state 58.

Hence, the child network device "D" 12 can adjust the storage of routes stored in the parent network device "I" 12 to eliminate and avoid saturation in the parent network device "I" 12, while maintaining a maximum number of routes by storing up to the saturation level in the parent network device "I" 12 as a preferred parent. As apparent from the foregoing, the detection of the transition between the saturation state 58 and the nonsaturated state 60 of the parent network device "I" 12 by the child network device "D" 12 also is based on the parent network device "I" 12 outputting updated no-path DIO messages 54 to its own parent network device "A", as illustrated in FIG. 1D, enabling the removal of routes and consequent elimination of saturation in the grandparent network device "A". Hence, the upward elimination of routes in the tree-based storing mode topology 14 can eliminate saturation in the saturated parent network devices higher in the tree.

In addition, each child network device can eliminate detected saturation as described above, such that the network devices "D", "H", etc. can independently contribute to elimination of saturation in the parent network devices "A", "B", "E", "F", "G", etc. A collision avoidance mechanism, such as the Trickle algorithm, can be employed to ensure that the elimination operations of one network device (e.g., "H") does not interfere with existing elimination operations by another network device (e.g., "D").

As an alternative to the execution of operations 76, 80, 82, and 90 regarding returning a selected portion of the removed routes back to the preferred parent network device "I", a child network device may detect that the preferred parent network device "I" has encountered severe congestion. For example, another network device (e.g., "N") could attach as a child (with multiple children network devices in its sub-DAG) to the parent network device "I" and supply the multiple stored routes for the respective multiple children network devices: in this example, the parent network device "I" could include in its saturated DIO message 22 an identification of the child network device having caused the saturation. Hence, the child network device "D" 12 can exponentially remove its stored routes from the congested parent network device "I" to enable recovery by the congested parent network device "I".

According to example embodiments, storing-mode tree-based topologies can be deployed in a scalable manner that avoids saturation in parent network devices, and enables the distributed elimination of any detected saturation encountered by parent network devices in the storing-mode tree-based topologies.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. An appratus implemented as a physical machine, the apparatus comprising:
   a device interface circuit configured for receiving, from a first parent network device in a tree-based storing mode topology of a data network, a first advertisement message, the apparatus implemented as a constrained network device;
   a memory circuit configured for storing route entries specifying respective routes for reaching respective destinations in the storing mode topology via the constrained network device; and
   a processor circuit configured attaching to the first parent network device in response to receiving the first advertisement message, and outputting to the first parent network device, via the device interface circuit, the routes stored in memory circuit, the processor circuit further configured for:
   determining that the first parent network device is encountering saturation of stored routes based on the constrained network device receiving a second advertisement message from the first parent network device; and
   eliminating the saturation encountered by the first parent network device based on moving at least a portion of the routes from the first parent network device to a second parent network device in the tree-based storing mode topology.

2. The method of claim 1, wherein the determining includes determining the saturation based on any one of:
   determining the second advertisement message specifies a flag bit indicating the saturation; or
   identifying from the second advertisement message a metric identifying a first number of free route entries available for storage via the first parent network device.

3. The method of claim 2, further comprising second attaching to the second parent network device in response to determining, from a third advertisement message generated by the second parent network device, that the second parent network device is not encountering saturation of stored routes.

4. The method of claim 3, wherein the third advertisement message specifies a corresponding second number of free route entries, the method further comprising:
   determining local free route entries in the constrained network device;
   determining a third number of free route entries available for storage via the constrained network device, based on determining a minimum availability relative to the first and second numbers of free route entries of the first and second parent network devices, respectively, relative to the local free route entries; and
   outputting a fourth advertisement message identifying the tree-based storing mode topology available via the constrained network device and specifying the third number of free route entries available for storage via the constrained network device.

5. The method of claim 4, wherein:
   the third number of free route entries available for storage via the constrained network device is further based on the constrained network device identifying a normalization factor relative to a number of parent network devices utilized by the constrained network device;
   the determining of the minimum availability comprising generating a normalized parent free route entry value based on dividing a sum of the first and second numbers of free route entries by the normalization factor, and identifying the third number of free route entries as a determined minimum of one of the normalized parent free route entry value or the local free route entries.

6. The method of claim 1, further comprising the constrained network device returning for storage, into the first parent network device, a second portion of the portion moved to the second parent network device, without causing saturation in the first parent network device.

7. The method of claim 6, wherein the eliminating comprises determining a saturation transition level indicating a storage capacity via the first parent network device based on:
   removing a prescribed minimum ratio of the plurality of routes from the first parent network device to the second network device;
   second determining after a set time interval, following said removing, whether the first parent network device still is encountering the saturation, and in response successively removing a corresponding successively exponentially increasing ratio of successively remaining routes in the first parent network device, to the second parent network device, until the constrained network device determines after a corresponding set time interval the first parent network device is no longer encountering the saturation after removal of a first identified number of removed routes associated with a final exponentially increased ratio from a penultimate number of the remaining routes;
   second returning from the second parent network device to the first parent network device a first returned number of the routes corresponding to the penultimate number of the remaining routes relative to the final exponentially increased ratio; and
   adjusting storage of the routes in the first parent network device based on repeating the second determining, selectively removing, and second returning until the routes returned for storage into the first parent network device converge toward the saturation transition level.

8. An apparatus implemented as a physical machine, the apparatus comprising:
   a device interface circuit configured for receiving, from a first parent network device in a tree-based storing mode topology of a data network, a first advertisement message, the apparatus implemented as a constrained network device;
   a memory circuit configured for storing route entries specifying respective routes for reaching respective destinations in the storing mode topology via the constrained network device; and
   a processor circuit configured for attaching to the first parent network device in response to receiving the first advertisement message, and outputting to the first parent network device, via the device interface circuit, the routes stored in memory circuit, the processor circuit further configured for:
   determining that the first parent network device is encountering saturation of stored routes based on the device interface circuit receiving a second advertisement message from the first parent network device, and
   eliminating the saturation encountered by the first parent network device based on moving at least a portion of the routes from the first parent network device to a second parent network device in the tree-based storing mode topology.

9. The apparatus of claim 8, wherein the processor circuit is configured for determining the saturation based on any one of:
   determining the second advertisement message specifies a flag bit indicating the saturation; or identifying from the second advertisement message a metric identifying a first number of free route entries available for storage via the first parent network device.

10. The apparatus of claim 9, wherein the processor circuit is configured for attaching to the second parent network device in response to determining, from a third advertisement message generated by the second parent network device and received by the device interface circuit, that the second parent network device is not encountering saturation of stored routes.

11. The apparatus of claim 10, wherein the third advertisement message specifies a corresponding second number of free route entries, the processor circuit further configured for:
determining local free route entries in the memory circuit;
determining a third number of free route entries available for storage via the constrained network device, based on determining a minimum availability relative to the first and second numbers of free route entries of the first and second parent network devices, respectively, relative to the local free route entries; and
generating and outputting a fourth advertisement message identifying the tree-based storing mode topology available via the constrained network device and specifying the third number of free route entries available for storage via the constrained network device.

12. The apparatus of claim 11, wherein:
the processor circuit is configured for determining the third number of free route entries based on identifying a normalization factor relative to a number of parent network devices utilized by the constrained network device;
the processor circuit is configured for determining the minimum availability, based on generating a normalized parent free route entry value based on dividing a sum of the first and second numbers of free route entries by the normalization factor, and identifying the third number of free route entries as a determined minimum of one of the normalized parent free route entry value or the local free route entries.

13. The apparatus of claim 8, wherein the processor circuit is configured for returning for storage, into the first parent network device, a second portion of the portion moved to the second parent network device, without causing saturation in the first parent network device.

14. The apparatus of claim 13, wherein the processor circuit is configured for determining a saturation transition level indicating a storage capacity via the first parent network device based on:
removing a prescribed minimum ratio of the plurality of routes from the first parent network device to the second network device;
second determining after a set time interval, following said removing, whether the first parent network device still is encountering the saturation, and in response successively removing a corresponding successively exponentially increasing ratio of successively remaining routes in the first parent network device, to the second parent network device, until the constrained network device determines after a corresponding set time interval the first parent network device is no longer encountering the saturation after removal of a first identified number of removed routes associated with a final exponentially increased ratio from a penultimate number of the remaining routes;
second returning from the second parent network device to the first parent network device a first returned number of the routes corresponding to the penultimate number of the remaining routes relative to the final exponentially increased ratio; and
adjusting storage of the routes in the first parent network device based on repeating the second determining, selectively removing, and second returning until the routes returned for storage into the first parent network device converge toward the saturation transition level.

15. One or more non-transitory tangible media encoded with logic for execution by a machine and when executed by the machine operable for:
attaching, by the machine implemented as a constrained network device in a data network, to a first parent network device in a tree-based storing mode topology in response to receiving a first advertisement message generated by the first parent network device;
outputting to the first parent network device a plurality of routes stored in the constrained network device, the routes identifying destinations reachable via the constrained network device;
determining, by the constrained network device, that the first parent network device is encountering saturation of stored routes based on the constrained network device receiving a second advertisement message from the first parent network device; and
eliminating, by the constrained network device, the saturation encountered by the first parent network device based on moving at least a portion of the routes from the first parent network device to a second parent network device in the tree-based storing mode topology.

16. The one or more non-transitory tangible media of claim 15, wherein the determining includes determining the saturation based on any one of:
determining the second advertisement message specifies a flag bit indicating the saturation; or
identifying from the second advertisement message a metric identifying a first number of free route entries available for storage via the first parent network device.

17. The one or more non-transitory tangible media of claim 16, further operable for second attaching to the second parent network device in response to determining, from a third advertisement message generated by the second parent network device, that the second parent network device is not encountering saturation of stored routes.

18. The one or more non-transitory tangible media of claim 17, wherein the third advertisement message specifies a corresponding second number of free route entries, further operable for:
determining local free route entries in the constrained network device;
determining a third number of free route entries available for storage via the constrained network device, based on determining a minimum availability relative to the first and second numbers of free route entries of the first and second parent network devices, respectively, relative to the local free route entries; and
outputting a fourth advertisement message identifying the tree-based storing mode topology available via the constrained network device and specifying the third number of free route entries available for storage via the constrained network device.

19. The one or more non-transitory tangible media of claim 15, further operable for returning for storage, into the first parent network device, a second portion of the portion moved to the second parent network device, without causing saturation in the first parent network device.

20. The one or more non-transitory tangible media of claim 19, wherein the eliminating comprises determining a saturation transition level indicating a storage capacity via the first parent network device based on:
- removing a prescribed minimum ratio of the plurality of routes from the first parent network device to the second network device;
- second determining after a set time interval, following said removing, whether the first parent network device still is encountering the saturation, and in response successively removing a corresponding successively exponentially increasing ratio of successively remaining routes in the first parent network device, to the second parent network device, until the constrained network device determines after a corresponding set time interval the first parent network device is no longer encountering the saturation after removal of a first identified number of removed routes associated with a final exponentially increased ratio from a penultimate number of the remaining routes;
- second returning from the second parent network device to the first parent network device a first returned number of the routes corresponding to the penultimate number of the remaining routes relative to the final exponentially increased ratio; and
- adjusting storage of the routes in the first parent network device based on repeating the second determining, selectively removing, and second returning until the routes returned for storage into the first parent network device converge toward the saturation transition level.

\* \* \* \* \*

UNITED STATES PATENT AND TRADEMARK OFFICE
CERTIFICATE OF CORRECTION

PATENT NO. : 10,887,224 B2
APPLICATION NO. : 16/397124
DATED : January 5, 2021
INVENTOR(S) : Thubert et al.

It is certified that error appears in the above-identified patent and that said Letters Patent is hereby corrected as shown below:

Column 19, replace Claim 1 in its entirety (Lines 1-26) with the following:
1. A method comprising:
 attaching, by a constrained network device in a data network, to a first parent network device in a tree-based storing mode topology in response to receiving a first advertisement message generated by the first parent network device;
 outputting to the first parent network device a plurality of routes stored in the constrained network device, the routes identifying destinations reachable via the constrained network device;
 determining, by the constrained network device, that the first parent network device is encountering saturation of stored routes based on the constrained network device receiving a second advertisement message from the first parent network device; and
 eliminating, by the constrained network device, the saturation encountered by the first parent network device based on moving at least a portion of the routes from the first parent network device to a second parent network device in the tree-based storing mode topology.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*